United States Patent Office 3,672,864
Patented June 27, 1972

3,672,864
CONTROL OF PESTS WITH CYCLOALKANE DERIVATIVES OF NITRATED ARYL COMPOUNDS
Lester L. Maravetz, Westfield, N.J., assignor to Esso Research and Engineering Company
No Drawing. Continuation-in-part of application Ser. No. 749,326, Aug. 1, 1968. This application June 11, 1970, Ser. No. 45,560
Int. Cl. A01n 9/14
U.S. Cl. 71—103      18 Claims

ABSTRACT OF THE DISCLOSURE

Compounds characterized by the following formula:

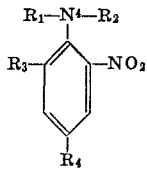

wherein (1) $R_1$ is a cycloalkyl-containing grouping such as

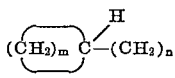

in which the cycloalkyl ring may be substituted with $C_1$–$C_3$ alkyl, $C_2$–$C_3$ alkenyl, halogen; $m$ is a positive integer of 2 to 4 and $n$ is 0 or 1 to 3; (2) $R_2$ is hydrogen; $C_1$–$C_{12}$ straight or branched chain alkyl, $C_2$–$C_6$ alkenyl or $C_2$–$C_6$ alkynyl; $C_3$–$C_8$ cycloalkyl; $C_4$–$C_{10}$ cycloalkylalkyl; $C_2$–$C_{12}$ alkoxyalkyl; $C_1$–$C_{12}$ haloalkyl; $C_1$–$C_{12}$ cyanoalkyl; $C_2$–$C_6$ acyl; $C_2$–$C_6$ alkylmercaptoalkyl, alkylsulfinylalkyl, alkylsulfonylalkyl; (3) $R_3$ is hydrogen, $NO_2$, halogen, $C_1$–$C_6$ alkyl, $C\equiv N$; and (4) $R_4$ is hydrogen, $C_1$–$C_{12}$ alkyl, haloalkyl, cycloalkyl, halogen, $CF_3$, $NO_2$, $C\equiv N$, phenyl, substituted phenyl,

$SO_2NR_5R_6$ wherein $R_5$ and $R_6$ can be the same as $R_2$ above; in addition, $R_5$ and $R_6$ when taken together with the nitrogen atom to which they are attached form an aziridyl, pyrolidyl or piperidyl ring; $CH_3S(O)_x$,

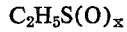

$C_3H_7S(O)_x$, wherein $x$ is 0, 1 or 2; are biologically active compounds especially useful as herbicides. Exemplary of an especially preferred nitrated aryl cyclopropane derivative is the compound of the formula::

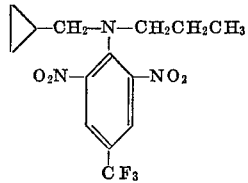

This invention is a continuation-in-part of an application filed Aug. 1, 1968 in the name of Lester L. Maravetz bearing Ser. No. 749,326, now U.S. Pat. No. 3,546,295.

SUMMARY OF THE INVENTION

Compounds characterized by the following formula:

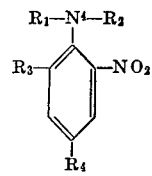

wherein (1) $R_1$ is a cycloalkyl-containing grouping such as

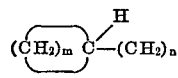

in which the cycloalkyl ring may be substituted with $C_1$–$C_3$ alkyl, $C_2$–$C_3$ alkenyl, halogen; $m$ is a positive integer of 2 to 4 and $n$ is 0 or 1 to 3; (2) $R_2$ is hydrogen; $C_1$–$C_{12}$ straight or branched chain alkyl, $C_2$–$C_6$ alkenyl or $C_2$–$C_6$ alkynyl; $C_3$–$C_8$ cycloalkyl; $C_4$–$C_{10}$ cycloalkylalkyl; $C_2$–$C_{12}$ alkoxyalkyl; $C_1$–$C_{12}$ haloalkyl; $C_1$–$C_{12}$ cyanoalkyl; $C_2$–$C_6$ acyl; $C_2$–$C_6$ alkylmercaptoalkyl, alkylsulfinylalkyl, alkylsulfonylalkyl; (3) $R_3$ is hydrogen, $NO_2$, halogen, $C_1$–$C_6$ alkyl, $C\equiv N$; and (4) $R_4$ is hydrogen, $C_1$–$C_{12}$ alkyl, haloalkyl, cycloalkyl, halogen, $CF_3$, $NO_2$, $C\equiv N$, phenyl, substituted phenyl, $$N=N-C_6H_5$$

$SO_2NR_5R_6$ wherein $R_5$ and $R_6$ can be the same as $R_2$ above; in addition, $R_5$ and $R_6$ when taken together with the nitrogen atom to which they are attached form an aziridyl, pyrolidyl or piperidyl ring; $CH_3S(O)_x$, $$C_2H_5S(O)_x$$

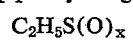

$C_3H_7S(O)_x$, wherein $x$ is 0, 1 or 2; are biologically active compounds especially useful as herbicides. Exemplary of an especially preferred nitrated aryl cyclopropane derivative is the compound of the formula:

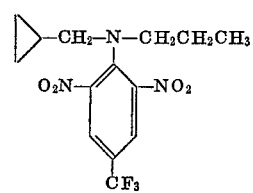

Specific examples of the compounds of this invention are:

1. N-cyclopropylmethyl-N-methyl-4-trifluoromethyl-2,6-dinitroaniline.
2. N-cyclopropylmethyl-N-ethyl-4-trifluoromethyl-2,6-dinitroaniline.
3. N-cyclopropylmethyl-N-n-propyl-4-trifluoromethyl-2,6-dinitroaniline.
4. N-cyclopropylmethyl-N-isopropyl-4-trifluoromethyl-2,6-dinitroaniline.
5. N-cyclopropylmethyl-N-n-butyl-4-trifluoromethyl-2,6-dinitroaniline.
6. N-cyclopropylmethyl-N-(3-methylmercaptopropyl)-4-trifluoromethyl-2,6-dinitroaniline.

7 N,N-bis(cyclopropylmethyl)-4-trifluoromethyl-2,6-dinitroaniline.
8 4-(methylsulfonyl)-2,6-dinitro-N-cyclopropylmethyl-N-methylaniline.
9 4-(methylsulfonyl)-2,6-dinitro-N-cyclopropylmethyl-N-ethylaniline.
10 4-(methylsulfonyl)-2,6-dinitro-N-cyclopropylmethyl-N-n-propylaniline.
11 4-(methylsulfonyl)-2,6-dinitro-N-cyclopropylmethyl-N-n-butylaniline.
12 4-(methylsulfonyl)-2,6-dinitro-N-cyclopropylmethyl-N-(3-methylmercaptopropyl)aniline.
13 N-cyclopropylmethyl-N-n-propyl-2,6-dinitroaniline.
14 N-cyclopropylmethyl-N-ethyl-2,6-dinitroaniline.
15 N-cyclopropylmethyl-N-n-propyl-2,6-dinitro-p-toluidine.
16 N-cyclopropylmethyl-N-ethyl-2,6-dinitro-p-toluidine.
17 N-cyclopropylmethyl-N-n-propyl-4-cyano-2,6-dinitroaniline.
18 N-cyclopropylmethyl-N-ethyl-4-cyano-2,6-dinitroaniline.
19 N-cyclopropylmethyl-N-n-propyl-2-nitro-4-trifluoromethylaniline.
20 N-cyclobutylmethyl-N-ethyl-4-trifluoromethyl-2,6-dinitroaniline.
21 N-cyclopentylmethyl-N-ethyl-4-trifluoromethyl-2,6-dinitroaniline.
22 N-cyclohexylmethyl-N-methyl-4-trifluoromethyl-2,6-dinitroaniline.
23 N-cyclohexyl-N-methyl-4-trifluoromethyl-2,6-dinitroaniline.
24 N-(methylsulfonyl)-2,6-dinitro-N-cyclopentylmethyl-N-ethylaniline.
25 4-(methylsulfonyl)-2,6-dinitro-N-cyclopropyl-N-ethylaniline.
26 N-cyclopropyl-N-ethyl-4-trifluoromethyl-2,6-dinitroaniline.
27 N-cyclopropyl-N-cyclopropylmethyl-4-trifluoromethyl-2,6-dinitroaniline.

Of the foregoing preferred compounds, the most preferred compounds of this invention include:

28 N-cyclopropylmethyl-N-ethyl-4-trifluoromethyl-2,6-dinitroaniline.
29 N-cyclopropylmethyl-N-n-propyl-4-trifluoromethyl-2,6-dinitroaniline.
30 N-cyclopropylmethyl-N-n-butyl-4-trifluoromethyl-2,6-dinitroaniline.
31 N,N-bis(cyclopropylmethyl)-4-trifluoromethyl-2,6-dinitroaniline.
32 4-(methylsulfonyl)-2,6-dinitro-N-cyclopropylmethyl-N-ethylaniline.
33 4-(methylsulfonyl)-2,6-dinitro-N-cyclopropylmethyl-N-n-propylaniline.
34 4-(methylsulfonyl)-2,6-dinitro-N-cyclopropylmethyl-N-n-butylaniline.
35 N-cyclopropylmethyl-N-n-propyl-2,6-dinitroaniline.
36 N-cyclopropylmethyl-N-n-propyl-2,6-dinitro-p-toluidine.
37 N-cyclopropylmethyl-N-n-propyl-4-cyano-2,6-dinitroaniline.
38 N-cyclopropylmethyl-N-ethyl-2,6-dinitroaniline.
39 N-cyclopropylmethyl-N-ethyl-2,6-dinitro-p-toluidine.
40 N-cyclopropylmethyl-N-ethyl-4-cyano-2,6-dinitroaniline.
41 N-cyclobutylmethyl-N-ethyl-4-trifluoromethyl-2,6-dinitroaniline.
42 4-(methylsulfonyl)-2,6-dinitro-N-cyclopropyl-N-ethylaniline.
43 N-cyclopropyl-N-ethyl-4-trifluoromethyl-2,6-dinitroaniline.
44 N-cyclopropyl-N-cyclopropylmethyl-4-trifluoromethyl-2,6-dinitroaniline.

Further explicit examples of the following general formula may be listed.

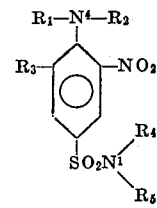

45 3,5-dinitro-$N^4$-cyclopropylmethyl-$N^4$-ethylsulfanilamide.
46 3,5-dinitro-$N^4$-n-butyl-$N^4$-(cyclopropylmethyl)sulfanilamide.
47 3,5-dinitro-$N^4$-iso-butyl-$N^4$-(cyclopropylmethyl)sulfanilamide.
48 3,5-dinitro-$N^4$-allyl-$N^4$-(cyclopropylmethyl)sulfanilamide.
49 3,5-dinitro-$N^4$-cyclopropylmethyl-$N^4$-n-hexylsulfanilamide.
50 3,5-dinitro-$N^4$-cyclopropylmethyl-$N^4$-methylsulfanilamide.
51 3,5-dinitro-$N^4$-cyclobutylmethyl-$N^4$-ethylsulfanilamide.
52 3,5-dinitro-$N^4$-cyclobutylmethyl-$N^4$-n-propylsulfanilamide.
53 $N^1,N^1$-di(5-hexynyl)-3,5-dinitro-$N^4$-cyclopentylmethyl-$N^4$-ethylsulfanilamide.
54 3,5-dinitro-$N^4$-cyclopentylmethyl-$N^4$-ethylsulfanilamide.
55 3,5-dinitro-$N^4,N^4$-bis(cyclopropylmethyl) sulfanilamide.
56 3,5-dinitro-$N^4$-crotyl-$N^4$-(cyclopropylmethyl)sulfanilamide.
57 3,5-dinitro-$N^4$-cyclopropylmethyl-$N^4$-(2-methylpentyl) sulfanilamide.
58 $N^1,N^1$-dimethyl-3,5-dinitro-$N^4$-cyclopropylmethyl-$N^4$-ethylsulfanilamide.
59 $N^1,N^1$-di(n-propyl)-3,5-dinitro-$N^4$-cyclopropylmethyl-$N^4$-ethylsulfanilamide.
60 $N^1,N^1$-diethyl-3,6-dinitro-$N^4$-cyclopropylmethyl-$N^4$-n-propylsulfanilamide.
61 $N^1$-methyl-3,5-dinitro-$N^4$-cyclopropylmethyl-$N^4$-n-propylsulfanilamide.
62 $N^1$-ethyl-3,5-dinitro-$N^4$-cyclopropylmethyl-$N^4$-n-propylsulfanilamide.
63 3,5-dinitro-$N^4$-cyclopropyl-$N^4$-n-propylsulfanilamide.
64 $N^1,N^1$-di(n-propyl)-3,5-dinitro-$N^4$-cyclopropyl-$N^4$-ethylsulfanilamide.
65 $N^1,N^1$-bis(3-methylpentyl)-3,5-dinitro-$N^4$-cyclobutylmethyl-$N^4$-ethylsulfanilamide.
66 $N^1,N^1$-diethyl-3,5-dinitro-$N^4$-cyclobutylmethyl-$N^4$-n-propylsulfanilamide.
67 $N^1,N^1$-bis(5-methoxypentyl)-$N^4$-cyclopentylmethyl-$N^4$-ethylsulfanilamide.
68 $N^1,N^1$-diallyl-3,5-dinitro-$N^4$-cyclopentyl-$N^4$-ethylsulfanilamide.
69 $N^1,N^1$-diethyl-3,5-dinitro-$N^4$-(1-methylcyclopropylmethyl)-$N^4$-ethylsulfanilamide.
70 $N^1,N^1$-di(n-propyl)-3,5-dinitro-$N^4$-(2-methylcyclopropylmethyl-$N^4$-ethylsulfanilamide.
71 4-(aziridinosulfonyl)-2,6-dinitro-N-cyclopropylmethyl-N-ethylaniline.
72 4-(pyrrolidylsulfonyl)-2,6-dinitro-N-cyclopropylmethyl-N-n-propylaniline.
73 3,5-dinitro-$N^4$-(1-n-propylcyclopropylmethyl)-$N^4$-ethylsulfanilamide.
74 3,5-dinitro-$N^4$-(1-allylcyclopropylmethyl)-$N^4$-ethylsulfanilamide.
75 3,5-dinitro-$N^4$-(2,2-dichlorocyclopropylmethyl)-$N^4$-n-propylsulfanilamide.
76 3,5-dinitro-$N^4$-(2,2-dibromocyclopropylmethyl)-$N^4$-ethylsulfanilamide.

77 3,5-dinitro-N⁴-(2-cyclopropylethyl)-N⁴-ethylsulfanilamide.
78 3,5-dinitro-N⁴-cyclopropylmethyl-N⁴-(3-hexenyl)sulfanilamide.
79 3,5-dinitro-N⁴-cyclopropylmethyl-N⁴-(5-hexynyl)sulfanilamide.
80 3,5-dinitro-N⁴-cyclopropylmethyl-N⁴-cyclopropylsulfanilamide.
81 3,5-dinitro-N⁴-cyclopropylmethyl-N⁴-cyclopentylsulfanilamide.
82 3,5-dinitro-N⁴-cyclopropylmethyl-N⁴-(cyclopentylmethyl)sulfanilamide.
83 3,5-dinitro-N⁴-cyclopropylmethyl-N⁴-(methoxymethyl)sulfanilamide.
84 3,5-dinitro-N⁴-cyclopropylmethyl-N⁴-(5-methoxypentyl)sulfanilamide.
85 3,5-dinitro-N⁴-cyclopropylmethyl-N⁴-(2-chloroethyl)sulfanilamide.
86 3,5-dinitro-N⁴-cyclopropylmethyl-N⁴-(6-bromohexyl)sulfanilamide.
87 3,5-dinitro-N⁴-cyclopropylmethyl-N⁴-(4-ethylthiobutyl)sulfanilamide.
88 3,5-dinitro-N⁴-cyclopropylmethyl-N⁴-(methylthiomethyl)sulfanilamide.
89 N¹,N¹-bis(2-chloroethyl)-N⁴-cyclobutylmethyl-N⁴-methylsulfanilamide.
90 N¹,N¹-bis(5-methylhtiopentyl)-N⁴-cyclopropylmethyl-N⁴-ethylsulfanilamide.
91 3-nitro-N⁴-cyclopropylmethyl-N⁴-ethylsulfanilamide.
92 3-nitro-N⁴-cyclopropylmethyl-N¹,N¹,N⁴-tri(n-propyl)-sulfanilamide.
93 2-nitro-4-(piperidylsulfonyl)-N-cyclopropylmethyl-N-ethylaniline.
94 3-nitro-5-t-butyl-N⁴-cyclopropylmethyl-N⁴-ethylsulfanilamide.
95 3-nitro-5-methyl-N⁴-cyclopropylmethyl-N⁴-n-propylsulfanilamide.

The foregoing compounds can be readily prepared by the following synthetic methods. For example, the preferred method for preparation of these products comprises reaction of the highly reactive compound 3,5-dinitro-4-chlorobenzotrifluoride, 4-chloro-3,5-dinitrophenyl methylsulfone, or 4-chloro-3, 5-dinitrobenzenesulfonic acid potassium (or sodium) salt thereof with an amine of the general structure $R_1R_2NH$, where $R_1$ and $R_2$ can have the same designation as previously expressed. During this reaction, elimination of hydrogen chloride occurs and this reacts with excess of the amine $R_1R_2NH$ to form the corresponding amine hydrochloride salt; alternatively, if desired, any tertiary amine, such as dimethylaniline or triethylamine can be reacted with the eliminated HCl to form the corresponding amine hydrochloride salt.

If it is desired that a suitable organic solvent such as ether, benzene, toluene, hexane, chlorinated hydrocarbons, etc. be used in this method, the resulting amine hydrochloride, which is insoluble in such solvent, is ordinarily removed by filtration. The filtrate, upon removal of the solvent, yields the desired product.

In an alternative embodiment, the novel amines of this invention can themselves be prepared via a two-step process in which the first step involves the reaction of a cycloalkyl carbonylchloride with various types of primary amines to form the corresponding N-substituted cycloalkanecarboxamide. In the second step of this alternative embodiment, these amides are then reduced to the desired secondary amines with an appropriate reducing agent, such as lithium aluminum hydride, or diborane, for example.

Typical illustrative reactants employed for the preferred method of this invention include, e.g., amines such as N-cyclopropylmethyl-N-n-propylamine,
N-cyclopropylmethyl-N-ethylamine,
N-cyclopropylmethyl-N-n-butylamine,
N-cyclohexyl-N-methylamine,
N-cyclopentylmethyl-N-ethylamine,
N-cyclobutylmethyl-N-ethylamine,
N-cyclopropylmethyl-N-crotylamine,
N-cyclopropyl-N-n-propylamine,
N-(1-methylcyclopropylmethyl)-N-ethylamine,
N-cyclopropylmethyl-N-(3-hexenyl)amine,
N-(2,2-dichlorocyclopropylmethyl)-N-n-propylamine,
N-cyclopropylmethyl-N-(5-hexynyl)amine,
N-cyclopropylmethyl-N-cyclopropylamine,
N-cyclopropylmethyl-N-(2-chloroethyl)amine,
N-cyclopropylmethyl-N-(5-methoxypentyl)amine,
N-cyclopropylmethyl-N-methylthiomethylamine, etc.;

with any of the following:

3,5-dinitro-4-chlorobenzotrifluoride;
4-chloro-3,5-dinitrophenylmethyl sulfone;
1-chloro-2,6-dinitrobenzene;
3,5-dinitro-4-chlorotoluene;
4-chloro-3,5-dinitrobenzonitrile;
4-chloro-3-nitro-benzotrifluoride;
4-chloro-3,5-dinitrobenzenesulfonic acid potassium (or sodium) salt;
3-nitro-4-chlorobenzenesulfonic acid potassium (or sodium) salt;
3-t-butyl-4-chloro-5-nitrobenzenesulfonic acid potassium (or sodium) salt;
4-chloro-3-methyl-5-nitrobenzenesulfonic acid potassium (or sodium) salt, etc.

In respect to the adducts formed by reaction of the amines with the above mentioned benzenesulfonic acid salts, such adducts are further converted to the corresponding benezensulfonylchlorides by action of a chlorinating agent, e.g., $POCl_3$ and $PCl_5$, and these are then reacted with ammonia, ammonium hydroxide, or various amines of the type $R_4R_5NH$ typically illustrated by the following: methylamine, ethylamine, n-propylamine, dimethylamine, diethylamine, di-n-propylamine, di-(5-hexynyl)amine, bis (3-methylpentyl)amine, bis(5-methoxypentyl)-amine, diallylamine, aziridine, pyrrolidine, piperidine, bis(2-chloroethyl amine, bis(5-methylthiopentyl)amine, etc.

Typical reaction conditions for the aforesaid methods are tabulated in Tables I, I–A and I–B.

TABLE I
Typical Reaction Conditions for Preparation of N-Cyclopropylmethyl-N-n-Propyl-4-Trifluoromethyl-2,6-Dinitroaniline

| Molar ratio of reactants | Temperature, °C. | P. atm. | Preferred solvents |
| --- | --- | --- | --- |
| 3,5-dinitro-4-chlorobenzotrifluoride (1 mole) plus N-cyclopropylmethyl-N-n-propylamine (1.1 mole) plus triethylamine (1.1–2.0 moles). | 0 to 150 {Preferred 25 to 90} | 1 | Benzene, toluene, ether, alcohols, chlorinated hydrocarbons. |
| Typical Reaction Conditions for Preparation of N-Cyclopropylmethyl-N-n-Propylamine | | | |
| Step (a): Cyclopropanecarboxylic acid chloride (1 mole) plus n-propylamine (2.1–3.0 moles). | −10 to 100 | 1 | Benzene, toluene, ethers, chlorinated hydrocarbons. |
| Step (b): N-n-propylcyclopropane-carboxamide (1.0 mole) plus lithium aluminum hydride (1.1–2.0 moles). | −25 to 75 | 1 | Diethylether, tetrahydrofuran, benzene. |

TABLE I-A
Typical Reaction Conditions for Preparation of 3,5-Dinitro-N⁴-Cyclopropylmethyl-N⁴-n-Propylsulfanilamide

| Molar ratio of reactants | Temperature, °C. | P. atm. | Preferred solvents |
|---|---|---|---|
| Step (a): 4-chloro-3,5-dinitrobenzenesulfonic acid potassium salt (1 mole) plus N-cyclopropylmethyl-N-n-propylamine (2.1 moles). | 0 to 150 | 1 | Dimethylformamide, benzene, toluene, xylene, ethers, alcohols, chlorinated hydrocarbons. |
| Step (b): Adduct of Step (a) (1 mole) plus phosphorous pentachloride (1.4 moles) plus phosphorous oxychloride (6.0 moles). | 0 to 200 | 1 | Phosphorous oxychloride, benzene, toluene, xylene, chlorinated hydrocarbons. |
| Step (c): Product of Step (b) (1 mole) plus ammonium hydroxide (2.5 moles) | 0 to 100 | 1 | Ammonium hydroxide. |

TABLE I-B
Typical Reaction Conditions for Preparation of 4-(Methylsulfonyl)-2,6-Dinitro-N-Cyclopropylmethyl-N-n-Propylaniline

| Molar ratio of reactants | Temperature °C. | P. atm. | Preferred solvents |
|---|---|---|---|
| 4-chloro-3,5-dinitrophenyl methylsulfone (1 mole) plus N-cyclopropylmethyl-N-n-propylamine (2.1 moles). | 0 to 150 (Preferred 25 to 90) | 1 | Benzene, toluene, ethers, alcohols, xylene, chlorinated hydrocarbons. |

The preferred titrated aryl cyclopropane derivatives of propyl, n-butyl, sec-butyl, isobutyl, cyclopropylmethyl, n-

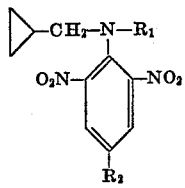

where $R_1$ can be hydrogen, methyl, ethyl, n-propyl, isopropyl, n-butyl, sec-butyl, isobutyl, cyclopropylmethyl, n-amyl, isoamyl, sec-amyl, allyl, propargyl, crotyl, methallyl, methoxyethyl, ethoxyethyl, n-propoxyethyl, 2-methoxyethyl, 2-ethoxyethyl, 2-methylmercaptoethyl, 3-methylmercaptopropyl, trifluoromethyl, pentafluoroethyl, 3-chloropropyl, trichloromethyl, bromomethyl, etc.; and $R_2$ can be hydrogen, methyl, ethyl, n-propyl, isopropyl, n-butyl, sec-butyl, isobutyl, t-butyl, n-pentyl, n-hexyl, cyano, cyclopentyl, cyclohexyl, $N=NC_6H_5$, phenyl and phenyl substituted with alkyl, halogen, $NO_2$, etc.

$R_2$ can also be a halogen such as chlorine, bromine or fluorine; haloalkyl groups such as trifluoromethyl, chloromethyl, trichloromethyl, bromomethyl, chloroethyl, bromoethyl, chloropropyl, bromopropyl; and the like. Moreover, $R_2$ can be $RS(O)_x$ where $R$=alkyl and $x$=0, 1, 2.

In still another embodiment, $R_2$ can also be a sulfonamide group such as $SO_2NR_3R_4$ where $R_3$ and $R_4$ can be the same as $R_1$ above; in addition, $R_3$ and $R_4$ when taken together with the nitrogen atom to which they are attached can form a ring system such as aziridyl, pyrrolidyl, or piperidyl, etc.

As previously noted, the present cycloalkane derivatives, and especially the cyclopropane derivative, of nitrated aryl compounds are useful as pesticides, particularly as herbicides. When so used, the biologically active cycloalkane derivatives of nitrated aryl compounds are preferably formulated with a suitable carrier or diluent or combinations thereof.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals—although subsequently subjected to grinding, sieving, purification, and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the cycloalkane derivatives of the present nitrated aryl.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax for example beeswax or a mineral wax such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or non-solvents for the active material. For example, the horticultural petroleum spray oils boiling in the range of from about 275° to about 575° F., or boiling in the range of about 575° to about 1,000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending, agent, and if desired, a finely divided solid carrier and/or a wetting agent. The active ingredient can be in particulate form or adsorbed on the carrier and preferably constitutes at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be non-ionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as, for example, the condensation product of oleic acid and ethylene oxide containing about 6 to 15 ethylene oxide units in the molecule. Other non-ionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example alcohols; ketones, especially acetone; ethers; hydrocarbons; etc.

While the toxicant itself is a liquid these materials can be sprayed on crops or insects without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a non-aqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test plants used, etc. by which the compounds and/or compositions described and claimed are prepared and/or used.

EXAMPLE 1

Preparation of N-cyclopropylmethyl-N-n-propyl-4-trifluoromethyl-2,6-dinitroaniline 3,5-dinitro-4-chlorobenzotrifluoride (14.6 grams, 0.054 mole) and N-cyclopropylmethyl-N-n-propylamine (13.0 grams, 0.115 mole) were mixed in a reaction flask, whereupon an exothermic reaction occurred with the temperature rising to a maximum of 80° C. The resultant deep orange-colored reaction mixture was heated at 100° to 120° C. for two hours with occasional stirring. After cooling the mixture, ether was added and the insoluble by-product, the amine hydrochloride, was removed by filtration. The filtrate was washed with 60 ml. portions of 5% hydrochloric acid and water, and then dried with $K_2CO_3$. The ether was removed under vacuum, leaving the red, oily residue of N-cyclopropylmethyl-N-n-propyl-4-trifluoromethyl-2,6-dinitroaniline (14.4 grams). The material was then crystallized by dissolving in hexane and chilling the solution with stirring in a Dry Ice bath. The resulting bright yellow solids which were obtained upon filtering melted at 27–28° C.

*Elemental analysis.*—Calculated (percent): C, 48.43; H, 4.65; N, 12.12. Found (percent): C, 48.22; H, 4.69; N, 12.45.

The nuclear magnetic resonance spectrum of this compound was consistent with its proposed structure.

EXAMPLE 2

Preparation of N-cyclopropylmethyl-N-ethyl-4-trifluoromethyl-2,6-dinitroaniline

In a reaction flask was placed 3,5-dinitro-4-chlorobenzotrifluoride (85.4 grams, 0.316 mole) and triethylamine (40.5 grams, 0.40 mole), dissolved in 800 ml. of benzene. The solution was cooled to approximately 10° C. with stirring and N-cyclopropylmethyl-N-ethylamine (35 grams, 0.347 mole), dissolved in 100 ml. of benzene, was added dropwise over 1½ hours. The mixture was refluxed for 2½ hours and then allowed to cool. Filtration of the solids (amine hydrochloride) gave a red-colored filtrate which was washed with 5% HCl and water. After drying the solution with $K_2CO_3$, the solvent was removed at reduced pressure to yield a yellow solid which was recrystallized from cold hexane. The product obtained was N-cyclopropylmethyl - N - ethyl - 4 - trifluoromethyl-2,6-dinitroaniline, melting point 32–33° C., in a yield of 80 grams.

*Elemental analysis.*—Calculated (percent): C, 46.8; H, 4.23; N, 12.61. Found (percent): C, 47.2; H, 4.93; N, 12.69.

The nuclear magnetic resonance spectrum substantiated its proposed structure.

EXAMPLE 3

Preparation of N-cyclopropylmethyl-N-methyl-4-trifluoromethyl-2,6-dinitroaniline Addition of an ether solution of 3,5-dinitro-4-chlorobenzotrifluoride (10.7 grams, 0.039 mole) to N-cyclopropylmethyl-N-methylamine (3.84 grams, 0.045 mole) and triethylamine (4.95 grams, 0.056 mole), dissolved in ether, yielded a precipitate of amine hydrochloride. The mixture was heated at reflux for one hour, cooled, and filtered. The filtrate, after workup in the usual manner, yielded yellow-orange solids, in a yield of 11.9 grams. The product was recrystallized from petroleum ether and had a melting point range of 59–60° C.

*Elemental analysis.*—Calculated (percent): C, 45.2; H, 3.78; N, 13.1. Found (percent): C, 44.8; H, 4.19; N, 13.3.

EXAMPLE 4

Preparation of N-cycloproplymethyl-N-isopropyl-4-trifluoromethyl-2,6-dinitroaniline Following the general procedure of Example 1, N-cyclopropylmethyl-N-isopropylamine (13 grams, 0.115 mole) was reacted with 3,5-dinitro-4-chlorobenzotrifluoride (14.6 grams, 0.054 mole) to yield 12.5 grams of product, after recrystallization from hexane. The material at 42.5–43.5° C.

*Elemental analysis.*—Calculated (percent): C, 48.43; H, 4.65; N, 12.12. Found (percent): C, 49.02; H, 4.79; N, 12.14.

EXAMPLE 5

Preparation of N-cyclopropylmethyl-N-n-butyl-4-trifluoromethyl-2,6-dinitroaniline According to the general procedure of Example 1, N-cyclopropylmethyl-N-n-butylamine (15.0 grams, 0.118 mole) was reacted with 3,5-dinitro-4-chlorobenzotrifluoride (14.6 grams, 0.054 mole) to yield the product, which was recrystallized from hexane and had a melting point range of 30–32° C.

*Elemental analysis.*—Calculated (percent): C, 49.9; H, 5.03; N, 11.64. Found (percent): C, 50.08; H, 5.21; N, 11.68.

EXAMPLE 6

Preparation of N,N-bis(cyclopropylmethyl)-4-trifluoromethyl-2,6-dinitroaniline

Following the general procedure of Example 1, N,N-bis(cyclopropylmethyl)amine (9.0 grams, 0.072 mole) was reacted with 3,5-dinitro-4-chlorobenzotrifluoride (0.73 grams, 0.036 mole) to yield 12.5 grams of crude product. Recrystallization of this material from hexane gave a product having at melting point range of 61–62° C.

*Elemental analysis.*—Calculated (percent): C, 50.1; H, 4.49; N, 11.70. Found (percent): C, 50.05; H, 4.72; N, 11.36.

EXAMPLE 7

Preparation of 4-(methylsulfonyl)-2,6-dinitro-N-cyclopropylmethyl-N-methylaniline To a suspension of 4-chloro-3,5-dinitrophenyl methylsulfone (7.5 grams, 0.027 mole) in 60 ml. of methanol was added N-cyclopropylmethyl-N-methylamine (5.1 grams, 0.06 mole) dissolved in twice its volume of methanol over a period of 10 minutes. A slight exothermic reaction was noted as orange-yellow colored solids formed during the addition. The mixture was heated at reflux for approximately one hour, chilled to 0° C., and then filtered. This process effected the separation of the methanol-insoluble product from the methanol-soluble amine hydrochloride by-product. The golden crystalline product (8.4 grams) was recrystallized from hot methanol. The melting point range of this final product was 143–145° C.

*Elemental analysis.*—Calculated (percent): C, 43.8; H, 4.59. Found (percent): C, 44.1; H, 4.82.

EXAMPLE 8

Preparation of 4-(methylsulfonyl)-2,6-dinitro-N-cyclopropylmethyl-N-ethylaniline Following the general procedure of Example 7, N-cyclopropylmethyl-N-ethylamine (5.9 grams, 0.06 mole) was reacted with 4-chloro-3,5-dinitrophenyl methylsulfone (7.5 grams, 0.027 mole) to give a crystalline product melting at 110–111° C. after recrystallization from methanol.

*Elemental analysis.*—Calculated (percent): C, 45.4; H, 4.98. Found (percent): C, 45.7; H, 5.31.

EXAMPLE 9

Preparation of 4-(methylsulfonyl)-2,6-dinitro-N-cyclopropylmethyl-N-n-propylaniline Following the procedure of Example 7, N-cyclopropylmethyl-N-n-propylamine (7.1 grams, 0.06 mole) was reacted with 4-chloro-3,5-dinitrophenyl methylsulfone (7.5 grams, 0.027 mole) to yield a product melting at 132–33° C.

*Elemental analysis.*—Calculated (percent): C, 47.1; H, 5.36; N, 8.97. Found (percent): C, 46.9; H, 5.54; N, 8.96.

EXAMPLE 10

Preparation of 4-(methylsulfonyl)-2,6-dinitro-N-cyclopropylmethyl-N-n-butylaniline According to the general procedure of Example 7, N-cyclopropylmethyl-N-n-butylamine (8.0 grams, 0.06 mole) was reacted with 4-chloro-3,5-dinitrophenyl methylsulfone to give a product melting at 88–90° C.

*Elemental analysis.*—Calculated (percent): C, 48.5; H, 5.69; N, 8.63. Found (percent): C, 48.0; H, 5.58; N, 8.59.

EXAMPLE 11

Preparation of N-cyclopropylmethyl-N-n-propyl-2,6-dinitroaniline

In a suitable reaction flask was placed 1-chloro-2,6-dinitrobenzene (10.1 grams, 0.05 mole), triethylamine (7.1 grams, 0.07 mole, 9.7 mil), and benzene (100 ml.). To this stirred solution, N-cyclopropylmethyl - N - n - propylamine (6.8 grams, 0.06 mole), dissolved in 10 ml. of benzene, was added dropwise at room temperature. The resulting solution was refluxed for 15 hours. After cooling the solution and filtering off the amine hydrochloride, the filtrate was washed with 9% HCl, then with water, and finally dried with $MgSO_4$. Removal of the solvent under reduced pressure yielded a viscous red oil which soon crystallized to a yellow solid weighing 12.7 grams. Recrystallization from a heptane-petroleum ether mixture gave a product melting at 47–48° C.

*Elemental analysis.*—Calculated (percent): C, 55.9; H, 6.14; N, 15.05. Found (percent): C, 56.0; H, 6.33; N, 14.79.

EXAMPLE 12

Preparation of N-cyclopropylmethyl-N-n-propyl-2,6-dinitro-p-toluidine

Following the general procedure of Example 1, N-cyclopropylmethyl - N - n - propylamine (11.3 grams, 0.10 mole) was reacted with 3,5-dinitro-4-chlorotoluene (10.8 grams, 0.05 mole) to yield a product melting at 26–28° C. after the usual workup and recrystallization from hexane.

Elemental analysis.—Calculated (percent): N, 14.33. Found (percent): N, 14.68.

EXAMPLE 13

Preparation of N-cyclopropylmethyl-N-n-propyl-4-cyano-2,6-dinitroaniline

N-cyclopropylmethyl - N - n - propylamine (11.1 grams, 0.098 mole) was dissolved in 100 ml. of benzene. To this stirred solution was added a solution of 4-chloro-3,5-dinitrobenzonitrile (10 grams, 0.044 mole) dropwise over a period of ½ hour. The resulting solution was refluxed for 40 hours. Workup of the product in the usual manner gave a bright yellow solid melting at 106.5–108° C.

Elemental analysis.—Calculated (percent): C, 55.25; H, 5.30; N, 18.41. Found (percent): C, 55.22; H, 5.48; N, 18.07.

EXAMPLE 14

Preparation of N-cyclopropylmethyl-4-trifluoromethyl-2,6-dinitroaniline

Cyclopropylmethylamine hydrochloride (5.3 grams, 0.05 mole), prepared according to the procedure of Roberts and Mazur (JACS 73, pp. 2509–20, 1951), was dissolved in 20 ml. of water. A solution of 4.0 grams (0.1 mole) of sodium hydroxide was added, followed by a portion-wise addition of solid 3,5-dinitro-4-chlorobenzotrifluoride. The resulting mixture was refluxed for one hour. After cooling, the oily product was separated from the aqueous phase and dissolved in boiling methanol. Chilling of the alcoholic solution precipitated solids which were filtered and air dried, and had a melting point range of 90–91° C.

Elemental analysis.—Calculated (percent): C, 43.5; H, 3.3; N, 13.8. Found (percent): C, 43.3; H, 3.6; N, 13.7.

EXAMPLE 15

Preparation of N-cyclopropylmethyl-N-n-propyl-2-nitro-4-trifluoromethylaniline

According to the general procedure of Example 2, N-cyclopropylmethyl - N - n - propylamine (6.79 grams, 0.06 mole) was reacted with 4-chloro-3-nitrobenzotrifluoride (11.3 grams, 0.05 mole), using benzene as a solvent. The reflux time was extended to 21 hours. Workup of the reaction mixture in the usual way yielded a red oil, which when subjected to vacuum distillation, gave a main cut (7.0 grams) of red oil having a boiling point range of 143–145° C. at 0.5 mm. of pressure.

Elemental analysis.—Calculated (percent): N, 9.27. Found (percent): N, 9.75.

EXAMPLE 16

According to the general procedures outlined in the preceding examples, the following additional compounds were synthesized:

(a) N-cyclopropylmethyl - N - ethyl-2,6-dinitroaniline, M.P. 47.5–49° C.

Elemental analysis.—Calculated (percent): C, 54.33; H, 5.7; N, 15.84. Found (percent): C, 54.53; H, 6.09; N, 15.59.

(b) N-cyclopropylmethyl - N - ethyl-2,6-dinitro-p-toluidine, M.P. 44–46° C.

Elemental analysis.—Calculated (percent): C, 55.90; H, 6.14; N, 15.05. Found (percent): C, 55.83; H, 6.54; N, 15.14.

(c) N-cyclopropylmethyl - N - (3-methylmercaptopropyl)-4-trifluoromethyl-2,6-dinitroaniline, M.P. 36–38° C.

Elemental analysis.—Calculated (percent): C, 46.0; H, 4.61; N, 10.7. Found (percent): C, 45.75; H, 4.40; N, 10.66.

(d) 4-(methylsulfonyl)-2,6-dinitro - N - cyclopropylmethyl - N - (3-methylmercaptopropyl)aniline, M.P. 72–76° C.

Elemental analysis.—Calculated (percent): N, 10.4. Found (percent): N, 9.58.

(e) N-cyclopropylmethyl - N - ethyl-4-cyano-2,6-dinitroaniline, M.P. 93–94° C.

Elemental analysis.—Calculated (percent): N, 19.3. Found (percent): N, 19.39.

(f) N-cyclobutylmethyl-N-ethyl - 4 - trifluoromethyl-2,6-dinitroaniline (oil).

Elemental analysis.—Calculated (percent): N, 12.1. Found (percent): N, 11.83.

(g) N-cyclopentylmethyl-N-ethyl - 4 - trifluoromethyl-2,6-dinitroaniline, M.P. 60–62° C.

Elemental analysis.—Calculated (percent): N, 11.6. Found (percent): N, 11.36.

(h) 4-(methylsulfonyl)-2,6-dinitro - N - cyclopentylmethyl-N-ethylaniline, M.P. 119–122° C.

Elemental analysis.—Calculated (percent): C, 48.6; H, 5.69; N, 11.32. Found (percent): C, 48.3; H, 5.40; N, 11.32.

(i) N-cyclohexylmethyl-N-methyl - 4 - trifluoromethyl-2,6-dinitroaniline, M.P. 104–106° C.

Elemental analysis.—Calculated (percent): N, 11.8. Found (percent): N, 11.96.

(j) N-cyclopropyl-N-ethyl - 4 - trifluoromethyl - 2,6-dinitroaniline, M.P. 71–73° C.

Elemental analysis.—Calculated (percent): C, 45.2; H, 3.79; N, 13.15. Found (percent): C, 45.16; H, 3.65; N, 13.34.

(k) 4-(methylsulfonyl)-2,6-dinitro - N - cyclopropyl-N-ethylaniline, M.P. 170–171° C.

Elemental analysis.—Calculated (percent): C, 43.8; H, 4.59; N, 12.78. Found (percent): C, 43.99; H, 4.96; N, 12.81.

(l) N-cyclopropyl-N-cyclopropylmethyl - 4 - trifluoromethyl-2,6-dinitroaniline, M.P. 45–54° C.

Elemental analysis.—Calculated (percent): N, 12.2. Found (percent): N, 12.23.

(m) N-cyclohexyl-N-methyl - 4 - trifluoromethyl-2,6-dinitroaniline, M.P. 67–68° C.

Elemental analysis.—Calculated (percent): C, 48.5; H, 4.66; N, 12.1. Found (percent): C, 48.67; H, 4.77; N, 11.74.

EXAMPLE 17

The amines used in the preparation of the compounds mentioned in Examples 1–15 and Examples 16(a)–16(i) can be synthesized via a two-step process, in accordance with the following experimental procedure.

First step: A molar quantity of cycloalkanecarboxylic acid chloride is reacted with a 2-molar quantity of an appropriate amine to form the corresponding N-alkylcycloalkanecarboxamide. The HCl liberated during this reaction is captured in the reaction medium by the excess amine via formation of the amine hydrochloride salt. If a suitable organic solvent such as diethylether, benzene, carbon tetrachloride, etc. is used for the reaction medium, the amine hydrochloride salt, which is insoluble, can be removed by filtration. The amide can then be recovered by removal of the solvent.

Second step: The N - alkylcycloalkanecarboxamide product of the first step is reduced with lithium aluminum hydride to the corresponding N-cycloalkylmethyl-N-alkylamine.

Both infrared and nuclear magnetic resonance spectroscopy can be utilized to confirm the structure of amines thus obtained. These techniques are especially useful to substantiate the presence of the cyclopropane ring which is contained in many of these compounds.

The following synthetic procedures, described in Examples 18 and 19, illustrate the general mode of preparation of the intermediate amides and amines. The physical constants of these compounds are consolidated in the table which follows, Table II.

EXAMPLE 18

Preparation of N-n-propylcyclopropanecarboxamide

In 600 ml. of benzene was dissolved n-propylamine (130 grams, 2.2 moles, 181 ml.). This well-stirred solution was cooled to about 10° C., and a solution of cyclopropanecarboxylic acid chloride (104.5 grams, 1.0 mole) in 100 ml. of benzene was added dropwise over a period of 1½ hours. During this time, white solids formed in the reaction medium. The mixture was heated at reflux for about three hours, cooled to room temperature, and filtered to remove the insoluble white n-propylamine hydrochloride salt. The filtrate was washed successively with 150 ml. portions of water, 5% HCl, water, 10% NaHCO₃, and water. The solution after being dried with anhydrous MgSO₄ was stripped of solvent to yield a crude oil (108.6 grams) which crystallized to a solid upon standing. A sample was recrystallized from petroleum ether to give material melting at 34–35° C.

*Elemental analysis.*—Calculated (percent): N, 11.01. Found (percent): N, 10.92.

EXAMPLE 19

Preparation of N-cyclopropylmethyl-N-n-propylamine

In a reaction flask was placed a suspension of lithium aluminum hydride (30 grams, 0.786 mole) in anhydrous ether (1 liter). A nitrogen blanket was held over the mixture throughout the reaction. To the stirred mixture was added dropwise a solution of N-n-propylcyclopropanecarboxamide (50 grams, 0.393 mole) in 300 ml. of dry ether over a period of two hours. Gentle refluxing of the solvent was evident during the addition. After the addition was complete, the mixture was heated at reflux for approximately 10 hours. The solution was cooled with an ice bath, while 6% aqueous sodium hydroxide was cautiously added dropwise to destroy the unreacted lithium aluminum hydride. The resulting white aluminate salts were removed by filtration and the clear ethereal filtrate was dried with potassium hydroxide pellets. After the ether was removed by distillation, the N-cyclopropylmethyl-N-n-propylamine was distilled at atmospheric pressure and found to have a boiling point range of 136–138° C. The yield was 27 grams.

*Elemental analysis.*—Calculated (percent): N, 11.01. Found (percent): N, 10.97.

As an alternate workup procedure, the ethereal solution obtained after filtration was extracted two or three times with 10% HCl. The acidic aqueous solution was basified with excess aqueous sodium hydroxide, and the amine which formed an insoluble upper layer was extracted with ether. After drying the ether solution with KOH pellets, the distillation procedure as described above was carried out.

Exemplary of products prepared in accordance with the procedures set forth in Examples 17–19 above, are listed in Table II below.

TABLE II

| | | N-alkylcycloalkanecarboxamides R₁CONHR₂ | | | N-cycloalkylmethyl-N-alkylamines R₁CH₂NHR₂ | | |
|---|---|---|---|---|---|---|---|
| | | | Nitrogen analysis | | | Nitrogen analysis | |
| R₁ | R₂ | M.P., °C. | Found | Calculated | B.P., °C./1 atm. | Found | Calculated |
|  | CH₃ | 48–51 | 13.99 | 14.13 | 91–93.5 | 16.85 | 16.4 |
|  | CH₂CH₃ | (Oil) | 11.81 | 12.39 | 110–12 | 13.39 | 14.12 |
|  | n-C₃H₇ | 34–35 | 10.92 | 11.01 | 136–38 | 12.40 | 12.3 |
|  | i-C₃H₇ | 91–92 | 10.87 | 11.01 | 125 | 12.65 | 12.3 |
|  | n-C₄H₉ | 36–37 | 9.98 | 9.92 | 158–59 | 11.06 | 11.0 |
|  | 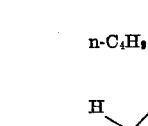 | 56–58 | 10.15 | 10.06 | 168–72 | 10.92 | 11.1 |
|  | (CH₂)₃SCH₃ | 48–50 | 8.09 | 8.09 | 62–3/0.1 mm. | 8.65 | 8.82 |
|  | CH₂CH₃ | 49–50 | 10.88 | 11.01 | 136–38 | 12.36 | 12.38 |
|  | CH₂CH₃ | | | | 164–165.5 | 10.51 | 11.01 |
|  | CH₃ | 104–106 | 9.95 | 9.92 | 173 | | |

NOTE.—NMR spectroscopy was used to verify the structures indicated in this table.

EXAMPLE 20

N-cyclopropyl-N-alkylamines which are used in the preparation of compounds illustrated by Examples 16(j), 16(k) and 16(l) may also be synthesized by reduction of the corresponding N-cyclopropyl amides under mild conditions. The method of Brown and Heim (see JACS 86, 3566 (1964) utilizing diborane as the reducing agent, can be used to prepare these amines. The following synthesis shows the general technique.

N-cyclopropyl-N-ethylamine

In a flask was placed 338 ml. of a 1 M borane in tetrahydrofuran solution (nitrogen atmosphere). The solution was cooled to approximately 0° C., and a solution of N-cyclopropylacetamide (16.6 grams, 0.169 mole) in tetrahydrofuran was added dropwise with stirring over a period of 60 minutes, maintaining a temperature of 0–5° C. The solution was heated at reflux for three hours and then cooled to room temperature. About 90 ml. of 5 N HCl solution was added dropwise and the reaction mixture was heated to reflux for 30 minutes. The tetrahydrofuran was removed by distillation at atmospheric pressure and the residue was made basic with excess of 50% NaOH solution. This basic solution was extracted with ether and the extracts were dried over KOH pellets. Distillation afforded 7.2 grams of N-cyclopropyl-N-ethylamine boiling at 101–103°/l. atm. Its structure was confirmed by nuclear magnetic resonance spectrum.

EXAMPLE 21

(A) Preparation of 3,5-dinitro-4-(N-cyclopropylmethyl-N-n-propylamino)benzenesulfonyl chloride A flask was charged with N-cyclopropylmethyl-N-n-propylamine (17.2 g., 0.13 mole) dissolved in 50 ml. of dimethylformamide. To this stirred solution at room temperature over a 30-minute period was added a solution of 4-chloro-3,5-dinitrobenzenesulfonic acid potassium salt (20.0 g., 0.062 mole) in dimethylformamide (130 ml.). The resulting wine-colored solution was heated at 75–80° C. for 15 hours, cooled, and poured into a large excess of ice water. The yellow solids which formed weighed 23.5 g. after filtration and drying.

Fifteen grams of this material were placed in another flask with 18 g. of phosphorus pentachloride. To the mixture was added slowly phosphorus oxychloride (34.5 ml.) with stirring. An exothermic reaction resulted as the temperature rose to about 40° C. After the addition was complete the red solution was heated at about 107° C. for three hours and allowed to stir at room temperature overnight. This clear red solution was poured over cracked ice and the mixture stirred vigorously until the ice had melted. Decantation of the aqueous phase left an oily residue which was taken up in ether. This solution was dried with $MgSO_4$, and solvent was removed under vacuum to yield 14.6 g. of a red crude oil. Crystallization from petroleum ether gave 10 g. of yellow powdery material of pungent odor.

*Elemental analysis.*—Calculated (percent): C, 9.4. Found (percent): C, 8.9.

(B) Preparation of 3,5-dinitro-$N^4$-cyclopropylmethyl-$N^4$-n-propylsulfanilamide A mixture of 3,5-dinitro-4-(N-cyclopropylmethyl-N-n-propylamino)benzenesulfonyl chloride (5.0 g.) and 4.5 ml. of 30% ammonium hydroxide solution was refluxed for two hours. After cooling, the reaction mixture was triturated with 200 ml. of ether, filtered, and the filtrate concentrated under vacuum to give a red-brown viscous residue.

*Elemental analysis.*—Calculated (percent): N, 15.61. Found (percent): N, 16.21.

EXAMPLE 22

Following the general procedure of Example 1, 3,5-dinitro-$N^4$-(1-methylcyclopropylmethyl) - $N^4$ - ethylsulfanilamide, a dark brown solid, was prepared.

*Elemental analysis.*—Calculated (percent): C, 43.57; H, 5.06. Found (percent): C, 42.97; H, 4.90.

EXAMPLE 23

Following the general procedure of Example 1, 3,5-dinitro - $N^4$ - (1-methylcyclopropylmethyl)-$N^4$-n-propylsulfanilamide, a dark-brown solid, was prepared.

*Elemental analysis.*—Calculated (percent): N, 15.04. Found (percent): N, 14.34.

EXAMPLE 24

Representative nitrated aryl cycloalkane derivatives from those prepared in the previous examples were evaluated for pre-emergence herbicidal activity in this example. The test procedure employed was as follows:

Two flats seeded with six crops (cotton, soybean, tomato, corn, rice and oats) and six weeds (mustard, morning glory, velvet leaf, crabgrass, Johnson grass, and foxtail) before germination were sprayed with a formulation containing the test chemical at rates described in Table III. The test chemicals were sprayed as acetone solutions or very small particle acetone suspensions onto the test plants. Sprayers were calibrated to deliver a certain volume of liquid and the calculated amount of active ingredient which would give a rate corresponding to the indicated lbs./acre. The flats were then held in the greenhouse and the response rated after 12 days to 16 days. Response was rated by a scale of 0–10. The 0–10 scale is defined as: 0=no injury; 1–3= slight injury; 4–6=moderate injury, plants may die; 7–9=severe injury, plants will probably die; and 10=all plants dead (complete kill). Treflan was used as the standard in the amount of 5 and 1.25 lbs./acre, respectively. Results of this test are shown in Table III and it is indicative that many of these compounds show a high degree of herbicidal activity against certain weed species, yet remain highly tolerant of desirable crop species.

For purposes of comparison with the cyclic compounds of this invention, two commercial herbicides, Treflan and Planavin, were evaluated in this test, as well as a new experimental sulfanilamide, Ryzelan.

TABLE III
Herbicide Activity

Structure: R1R2N-phenyl with NO2 (R3) at ortho and R4 at para position.

| R1 | R2 | R3 | R4 | Rate, lbs/acre | Corn | Soybean | Cotton | Rice | Morning glory | Tomato | Oats | Crabgrass | Johnson grass | Yellow foxtail | Velvet leaf | Mustard |
|---|---|---|---|---|---|---|---|---|---|---|---|---|---|---|---|---|
| △-CH2 | CH3 | NO2 | CF3 | 10<br>1.25 | 1<br>0 | 0<br>0 | 0<br>0 | 0<br>0 | 0<br>0 | 0<br>0 | 3<br>0 | 10<br>9 | 9<br>5 | 9<br>7 | 2<br>0 | 2<br>0 |
| △-CH2 | C2H5 | NO2 | CF3 | 5<br>1.25 | 4<br>0 | 0<br>2 | 3<br>0 | 9<br>2 | 0<br>0 | 0<br>0 | 3<br>0 | 10<br>8 | 10<br>8 | 9<br>8 | 2<br>2 | 4<br>0 |
| △-CH2 | n-C3H7 | NO2 | CF3 | 10<br>1.25 | 6<br>1 | 4<br>0 | 8<br>4 | 5<br>1 | 5<br>0 | 5<br>0 | 7<br>1 | 10<br>10 | 10<br>9 | 10<br>9 | 5<br>0 | 3<br>0 |
| △-CH2 | i-C3H7 | NO2 | CF3 | 10<br>1.25 | 1<br>1 | 0<br>0 | 5<br>8 | 3<br>1 | 0<br>0 | 0<br>0 | 0<br>0 | 9<br>0 | 7<br>0 | 8<br>0 | 0<br>0 | 5<br>3 |
| △-CH2 | n-C4H9 | NO2 | CF3 | 10<br>1.25 | 1<br>1 | 0<br>0 | 8<br>0 | 2<br>2 | 0<br>0 | 0<br>0 | 2<br>0 | 9<br>7 | 9<br>5 | 8<br>2 | 0<br>1 | 1<br>0 |
| △-CH2 | △-CH2 | NO2 | CF3 | 10<br>1.25 | 1<br>0 | 0<br>0 | 0<br>0 | 5<br>2 | 0<br>0 | 0<br>0 | 1<br>0 | 9<br>9 | 9<br>6 | 9<br>6 | 0<br>0 | 3<br>2 |
| △-CH2 | CH3 | NO2 | SO2CH3 | 10<br>1.25 | 0<br>0 | 0<br>0 | 0<br>0 | 3<br>0 | 0<br>0 | 0<br>0 | 0<br>0 | 10<br>1 | 7<br>0 | 7<br>0 | 0<br>0 | 2<br>0 |
| △-CH2 | C2H5 | NO2 | SO2CH3 | 10<br>1.25 | 1<br>0 | 0<br>0 | 3<br>7 | 3<br>2 | 0<br>0 | 0<br>0 | 2<br>0 | 10<br>10 | 9<br>8 | 9<br>7 | 8<br>0 | 6<br>1 |
| △-CH2 | n-C3H7 | NO2 | SO2CH3 | 10<br>1.25 | 1<br>0 | 1<br>0 | 8<br>0 | 3<br>3 | 0<br>1 | 0<br>0 | 3<br>0 | 10<br>9 | 9<br>3 | 7<br>2 | 0<br>0 | 2<br>2 |
| △-CH2 | n-C4H9 | NO2 | SO2CH3 | 10<br>1.25 | 1<br>0 | 0<br>1 | 0<br>0 | 2<br>0 | 0<br>0 | 0<br>1 | 2<br>0 | 8<br>6 | 5<br>3 | 4<br>0 | 0<br>0 | 0<br>2 |
| n-C3H7 | n-C3H7 (Planavin) | NO2 | SO2CH3 | 10<br>1.25 | 3<br>0 | 0<br>1 | 7<br>0 | 5<br>2 | 6<br>5 | 5<br>0 | 7<br>0 | 10<br>10 | 9<br>4 | 9<br>4 | 5<br>2 | 5<br>0 |
| △-CH2 | (CH2)3SCH3 | NO2 | SO2CH3 | 10 | 0 | 0 | 3 | 0 | 0 | 0 | 4 | 5 | 0 | 0 | 0 | 0 |
| 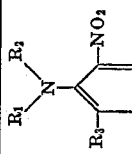-CH2 | C2H5 | NO2 | SO2CH3 | 10 | 0 | 0 | 0 | 0 | 0 | 0 | 0 | 8 | 5 | 5 | 0 | 0 |

TABLE III—Continued

| R₁ | R₂ | R₃ | R₄ | Rate, lbs/acre | Preemergence test | | | | | | | | | | | |
|---|---|---|---|---|---|---|---|---|---|---|---|---|---|---|---|---|
| | | | | | Corn | Soybean | Cotton | Rice | Morning glory | Tomato | Oats | Crabgrass | Johnson grass | Yellow foxtail | Velvet leaf | Mustard |
| △—CH₂ | n—C₃H₇ | NO₂ | H | 10 / 1.25 | 0 / 0 | 0 / 0 | 10 / 0 | 5 / 2 | 0 / 0 | 0 / 0 | 0 / 0 | 9 / 7 | 9 / 3 | 8 / 6 | 5 / 0 | 0 / 1 |
| △—CH₂ | C₂H₅ | NO₂ | H | 10 / 1.25 | 0 / 0 | 0 / 0 | 6 / 0 | 1 / 0 | 0 / 0 | 0 / 0 | 0 / 0 | 9 / 0 | 7 / 0 | 9 / 0 | 2 / 0 | 0 / 3 |
| △—CH₂ | n—C₃H₇ | NO₂ | CH₃ | 10 / 1.25 | 0 / 0 | 0 / 0 | 5 / 0 | 4 / 2 | 0 / 0 | 0 / 0 | 5 / 0 | 10 / 9 | 10 / 9 | 9 / 8 | 6 / 0 | 5 / 2 |
| △—CH₂ | C₂H₅ | NO₂ | CH₃ | 10 / 1.25 | 1 / 0 | 3 / 0 | 3 / 0 | 5 / 1 | 0 / 0 | 0 / 0 | 3 / 0 | 10 / 9 | 9 / 6 | 9 / 8 | 2 / 0 | 2 / 0 |
| △—CH₂ | n—C₃H₇ | NO₂ | C≡N | 10 / 1.25 | 1 / 0 | 0 / 0 | 0 / 10 | 2 / 5 | 0 / 2 | 0 / 0 | 4 / 0 | 10 / 7 | 9 / 9 | 8 / 5 | 0 / 4 | 0 / 2 |
| △—CH₂ | C₂H₅ | NO₂ | C≡N | 10 | 0 | 0 | 5 | 0 | 0 | 0 | 0 | 9 | 8 | 9 | 2 | 0 |
| △—CH₂ | n—C₃H₇ | H | CF₃ | 10 | 1 | 0 | 4 | 2 | 0 | 0 | 1 | 7 | 5 | 5 | 0 | 4 |
| △—CH₂ | (CH₂)₃SCH₃ | NO₂ | CF₃ | 10 | 0 | 0 | 0 | 0 | 0 | 0 | 0 | 9 | 6 | 7 | 0 | 0 |
| △—CH₂ | H | NO₂ | CF₃ | 10 | 0 | 0 | 5 | 5 | 0 | 1 | 0 | 0 | 5 | 0 | 6 | 3 |
| n-C₃H₇ | n-C₃H₇ Treflan | NO₂ | CF₃ | 5 / 1.25 | 1 / 0 | 4 / 1 | 3 / 0 | 5 / 3 | 3 / 0 | 5 / 0 | 3 / 0 | 10 / 10 | 10 / 7 | 10 / 8 | 2 / 0 | 4 / 1 |
| ◇—CH₂ | C₂H₅ | NO₂ | CF₃ | 10 | 0 | 0 | 10 | 0 | 0 | 0 | 2 | 10 | 9 | 9 | 0 | 0 |
| ⬠—CH₂ | C₂H₅ | NO₂ | CF₃ | 10 | 0 | 0 | 0 | 0 | 0 | 0 | 0 | 9 | 6 | 7 | 0 | 7 |

TABLE III—Continued

| $R_1$ | $R_2$ | $R_3$ | $R_4$ | Rate, lbs./acre | Corn | Soybean | Cotton | Rice | Morning glory | Tomato | Oats | Crabgrass | Johnson grass | Yellow foxtail | Velvet leaf | Mustard |
|---|---|---|---|---|---|---|---|---|---|---|---|---|---|---|---|---|
| cyclohexyl-CH₃ | CH₃ | NO₂ | CF₃ | 10 | 1 | 0 | 0 | 0 | 0 | 0 | 0 | 0 | 0 | 0 | 0 | 5 |
| cyclohexyl | CH₃ | NO₂ | CF₃ | 10 / 1.25 | 1/1 | 0/2 | 7/0 | 2/2 | 0/0 | 0/0 | 1/0 | 9/3 | 7/0 | 7/0 | 1/0 | 2/0 |
| cyclopentyl-CH₃ | C₂H₅ | NO₂ | SO₂CH₃ | 10 | 0 | 0 | 0 | 0 | 0 | 0 | 0 | 8 | 5 | 5 | 0 | 0 |
| cyclohexyl-CH₃ | CH₃ | NO₂ | SO₂CH₃ | 10 | 1 | 0 | 2 | 0 | 0 | 2 | 0 | 1 | 0 | 0 | 0 | 3 |
| cyclohexyl | CH₃ | NO₂ | SO₂CH₃ | 10 | 0 | 0 | 2 | 1 | 0 | 0 | 2 | 9 | 3 | 1 | 0 | 0 |
| cyclopropyl-CH₂ | n-C₃H₇ | NO₂ | SO₂NH₂ | 5 / 0.63 | 3/0 | 0 | 2/0 | 4/1 | 9/1 | 9/1 | 4/0 | 9/8 | 9/8 | 10/7 | — | 5/0 |
| dimethylcyclopropyl | n-C₃H₇ | NO₂ | SO₂NH₂ | 5 / 0.63 | 0/0 | 0/0 | 0/0 | 8/4 | 0/0 | 0/0 | 0/0 | 9/7 | — | 9/7 | — | 0/0 |
| dimethylcyclopropyl | C₂H₅ | NO₂ | SO₂NH₂ | 5 / 0.63 | 0/0 | 0/0 | 3/1 | 8/3 | 0/0 | 0/0 | 0/0 | 9/6 | — | 8/6 | — | 2/1 |
| n-C₃H₇ (Ryzelan) | n-C₃H₇ | NO₂ | SO₂NH₂ | 5 / 0.63 | 0/0 | 0/0 | 0/0 | 2/3 | 2/1 | 2/1 | 0/0 | 8/4 | — | 8/2 | — | 0/0 |

EXAMPLE 25

In this example representative cycloalkane derivatives of the nitrated aryl compounds of this invention were evaluated for post-emergence activity. The test procedure was as follows:

Flats were seeded, as described in the previous example, and held until the first true leaves had appeared on all plants, which were then sprayed in the same fashion as in the preceding example at a rate of 10 lbs./acre. The plant responses were rated 12–16 days after treatment on the same scale as described previously. The test results are shown in Table IV.

TABLE IV
Herbicide activity

| | | | | | Preemergence test | | | | | | | | | |
|---|---|---|---|---|---|---|---|---|---|---|---|---|---|---|
| R₁ | R₂ | R₃ | R₄ | Rate, lbs./acre | Corn | Soybean | Cotton | Rice | Morning glory | Tomato | Oats | Crabgrass | Johnson grass | Yellow foxtail | Velvet leaf | Mustard |
| −CH₂−cyclopropyl | CH₃ | NO₂ | CF₃ | 10 | 2 | 1 | 2 | 2 | 1 | 5 | 5 | 1 | 7 | 5 | 5 | 5 |
| −CH₂−cyclopropyl | C₂H₅ | NO₂ | CF₃ | 10 | 1 | 3 | 1 | — | 2 | 1 | 1 | 0 | — | 1 | — | 2 |
| −CH₂−cyclopropyl | n-C₃H₇ | NO₂ | CF₃ | 10 | 7 | 5 | 8 | 5 | 5 | 6 | 5 | 9 | 8 | 8 | 5 | 5 |
| −CH₂−cyclopropyl | i-C₃H₇ | NO₂ | CF₃ | 10 | 2 | 3 | 3 | 3 | 2 | 2 | 5 | 7 | 6 | 5 | 4 | 2 |
| −CH₂−cyclopropyl | n-C₄H₉ | NO₂ | CF₃ | 10 | 0 | 3 | 1 | 1 | 2 | 3 | 3 | 8 | 4 | 4 | 5 | 4 |
| −CH₂−cyclopropyl | −CH₂−cyclopropyl | NO₂ | CF₃ | 10 | 0 | 1 | 0 | 0 | 1 | 0 | 5 | 0 | 0 | 0 | 3 | 3 |
| −CH₂−cyclopropyl | (CH₂)₃SCH₃ | NO₂ | CF₃ | 10 | 1 | 2 | 0 | 2 | 3 | 2 | 6 | 8 | 3 | 6 | 1 | 3 |
| −CH₂−cyclopropyl | CH₃ | NO₂ | SO₂CH₃ | 10 | 4 | 2 | 0 | 2 | 0 | 1 | 1 | 5 | 5 | 0 | 0 | 0 |
| −CH₂−cyclopropyl | C₂H₅ | NO₂ | SO₂CH₃ | 10 | 3 | 2 | 10 | 2 | 1 | 1 | 0 | 6 | 5 | 2 | 3 | 0 |
| −CH₂−cyclopropyl | n-C₃H₇ | NO₂ | SO₂CH₃ | 10 | 0 | 3 | 8 | 4 | 2 | 6 | 1 | 7 | 4 | 0 | 2 | 0 |
| −CH₂−cyclopropyl | n-C₄H₉ | NO₂ | SO₂CH₃ | 10 | 0 | 1 | 6 | 0 | 0 | 0 | 1 | 0 | 0 | 0 | 0 | 1 |
| −CH₂−cyclopropyl | (CH₂)₃SCH₃ | NO₂ | SO₂CH₃ | 10 | 0 | 1 | 1 | 0 | 1 | 0 | 1 | 0 | 0 | 0 | 0 | 0 |
| −CH₂−cyclopropyl | n-C₃H₇ | NO₂ | H | 10 | 3 | 2 | 1 | 3 | 2 | 4 | 5 | 7 | 6 | 5 | 5 | 4 |
| −CH₂−cyclopropyl | C₂H₅ | NO₂ | H | 10 | 2 | 2 | 6 | 2 | 2 | 6 | 3 | 9 | 5 | 7 | 4 | 9 |

TABLE IV—Continued

Structure: R1R2N-Ar where Ar = phenyl with R3 (ortho), NO2 (ortho), R4 (para)

| R1 | R2 | R3 | R4 | Rate, lbs/acre | Corn | Soybean | Cotton | Rice | Morning glory | Tomato | Oats | Crabgrass | Johnson grass | Yellow foxtail | Velvet leaf | Mustard |
|---|---|---|---|---|---|---|---|---|---|---|---|---|---|---|---|---|
| cyclopropyl-CH2 | n-C3H7 | NO2 | CH3 | 10 | 3 | 3 | 1 | 2 | 3 | 5 | 6 | 7 | 7 | 5 | 3 | 5 |
| cyclopropyl-CH2 | C2H5 | NO2 | CH3 | 10 | 5 | 5 | 3 | 3 | 2 | 6 | 5 | 9 | 9 | 7 | 2 | 7 |
| cyclopropyl-CH2 | n-C3H7 | NO2 | C≡N | 10 | 0 | 0 | 0 | 0 | 0 | 4 | 1 | 5 | 3 | 2 | 0 | 0 |
| cyclopropyl-CH2 | C2H5 | NO2 | C≡N | 10 | 0 | 1 | 0 | 0 | 0 | 1 | 1 | 4 | 2 | 0 | 2 | 1 |
| cyclopropyl-CH2 | n-C3H7 | H | CF3 | 10 | 3 | 2 | 1 | 3 | 2 | 2 | 0 | 3 | 2 | 2 | 1 | 1 |
| cyclopropyl-CH2 | H | NO2 | CF3 | 10 | 0 | 1 | 10 | 2 | 0 | 1 | 0 | 0 | 0 | 0 | 0 | 0 |
| cyclobutyl-CH2 | C2H5 | NO2 | CF3 | 10 | 0 | 6 | 10 | 0 | 1 | 3 | 6 | 7 | 6 | 4 | 1 | 2 |
| cyclopentyl-CH2 | C2H5 | NO2 | CF3 | 10 | 8 | 2 | 0 | 4 | 1 | 8 | 5 | 9 | 8 | 8 | 2 | 5 |
| cyclohexyl | CH3 | NO2 | CF3 | 10 | 0 | 1 | 3 | 1 | 1 | 2 | 1 | 0 | 0 | 0 | 0 | 0 |
| cyclohexyl-CH2 | CH3 | NO2 | CF3 | 10 | 1 | 2 | 1 | 0 | 1 | 1 | 1 | 7 | 2 | 1 | 0 | 2 |
| cyclohexyl | C2H5 | NO2 | SO2CH3 | 10 | 3 | 1 | 0 | 2 | 1 | 3 | 2 | 6 | 1 | 0 | 1 | 0 |
| cyclohexyl-CH2 | CH3 | NO2 | SO2CH3 | 10 | 2 | 2 | 2 | 0 | 0 | 1 | 0 | 0 | 0 | 0 | 0 | 0 |
| cyclohexyl | CH3 | NO2 | SO2CH3 | 10 | 0 | 0 | 0 | 0 | 0 | 1 | 0 | 0 | 0 | 0 | 1 | 0 |
| cyclopropyl-CH2 | n-C3H7 | NO2 | SO2NH2 | 10 | 8 | 3 | 4 | 6 | 6— | 6— | 5 | 10 | — | 7— | — | 7 |

EXAMPLE 26

In this example a pre-emergence herbicide field study was carried out to compare the activity of the commercial material Treflan (N,N-di-n-propyl-4-trifluoromethyl-2,6-dinitroaniline) with that of a specific example disclosed in this invention, namely N-cyclopropylmethyl-N-propyl-4-trifluoromethyl-2,6-dinitroaniline. Tests were carried out on a number of crop and weed species and the chemicals were incorporated into the soil at an application rate of 0.75 lb./acre. Observations were made four weeks after the planting date to determine the relative effects on the crops as well as the overall effect on broadleaf weed species and grassy weed species. Ratings were on a 0–10 scale where 0=no effect and 10=complete kill or no emergence. The data are summarized in Table V. The results show that in general the scope of activity of both compounds against weed species is extremely good. However, in addition, the cyclopropyl derivative appears to show some unexpected crop tolerance which exceeds the tolerance of Treflan to these same species.

TABLE V
Results of Multi-crop Screening Trial

| | Rate, lbs./acre | Alfalfa | Carrots | Corn | Cotton | Cucumber | Grain sorghum | Kale | Lespedeza | Mustard | Oats | Peanuts | Red beets | Rice | Snap beans | Southern peas | Soybeans | Spinach | Squash | Tomatoes | Wheat | Sunflower | Barnyardgrass | Cocklebur | Crabgrass | Giant foxtail | Johnsongrass | Goosegrass | Morningglory | Pigweed | Prickly sida |
|---|---|---|---|---|---|---|---|---|---|---|---|---|---|---|---|---|---|---|---|---|---|---|---|---|---|---|---|---|---|---|---|
| CPTD | 0.75 | 4 | 7 | 5 | 1 | 6 | 8 | 0 | 8 | 0 | 9 | 3 | 10 | 8 | 0 | 0 | 0 | 8 | 2 | 4 | 5 | 0 | 10 | 1 | 10 | 9 | 10 | 10 | 5S | 10 | 4 |
| Treflan | 0.75 | 3 | 8 | 6 | 3 | 7 | 10 | 1 | 8 | 5 | 9 | 6 | 10 | 9 | 3 | 2 | 0 | 8 | 6 | 7 | 8 | 0 | 10 | 1 | 10 | 10 | 9 | 10 | 8S | 9 | 5 |

NOTE.—CPTD =N-cyclopropylmethyl-N-n-propyl-4-trifluoromethyl-2,6-dinitroaniline. S=Stunting.

EXAMPLE 27

The effect of N-cyclopropylmethyl-N-n-propyl-4-trifluoromethyl-2,6-dinitroaniline against a series of grassy weeds in a pre-emergence soil incorporated herbicide test was carried out at a rate of 1.25 lbs./acre. The 0–10 rating system is the same as indicated in previous examples. The data are summarized below:

|  | 1.25 lbs./acre |
|---|---|
| Quack grass | 7 |
| Johnson grass | 8 |
| Annual Rye | 9 |
| Yellow foxtail | 8 |
| Barnyard grass | 8 |
| Crabgrass | 9 |

The following examples, Examples 28 and 29, illustrate typical pesticidal compositions or formulations of this invention. Parts are by weight.

EXAMPLE 28

A typical wettable powder concentrate that is diluted to the desired concentration by dispersing it in water has the following composition:

|  | Parts |
|---|---|
| Active ingredient | 50 |
| Solid carrier (e.g. attapulgite) | 42 |
| Dispersant (monocalcium salt of polymeric alkylaryl sulfonic acid) | 4 |
| Wetting agent (sodium alkyl naphthalene sulfate (Nekal BA-75')) | 4 |

EXAMPLE 29

A liquid concentrate that is diluted in the field with water has the following composition:

|  | Parts |
|---|---|
| Active ingredient | 45 |
| Xylene | 45 |
| Emulsifier (blend of calcium dodecylbenzenesulfonate and alkyl aryl polyethylene oxide adduct) | 10 |

What is claimed is:

1. A method for combatting growth of undesired vegetation comprising treating said undesired vegetation with a herbicidally effective amount of a compound of the formula

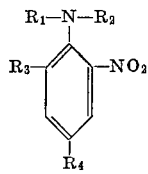

wherein (1) $R_1$ is a cycloalkyl containing group characterized by the following structural formula

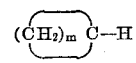

in which the cycloalkyl ring itself may be optionally substituted with $C_1$–$C_6$ alkyl or $C_2$–$C_6$ alkenyl; $n$ is either 0 or 1; $m$ is a positive integer ranging from 2 to 4 when $n$ is 1, however when $n$ is 0, $m$ is 2; (2) $R_2$ is $C_1$–$C_6$ straight or branched chain alkyl, $C_2$–$C_6$ alkenyl, cyclopropyl, $C_4$ cycloalkylalkyl or $C_2$–$C_6$ alkylmercaptoalkyl; (3) $R_3$ is hydrogen or $NO_2$; (4) $R_4$ is hydrogen, $C_1$–$C_6$ alkyl, $CF_3$, $CH_3S(O)_x$, $C_2H_5S(O)_x$ or $C_3H_7S(O)_x$, wherein $x$ is 0, 1 or 2.

2. A method according to claim 1 in which the compound is N-cyclopropylmethyl-N-ethyl-4-trifluoromethyl-2,6-dinitroaniline.

3. A method according to claim 1 in which the compound is N-cyclopropylmethyl-N-n-propyl-4-trifluoromethyl-2,6-dinitroaniline.

4. A method according to claim 1 in which the compound is N-cyclobutylmethyl-N-ethyl-4-trifluoromethyl-2,6-dinitroaniline.

5. A method according to claim 1 in which the compound is N-cyclopropylmethyl-N-n-propyl-2,6-dinitroaniline.

6. A method according to claim 1 in which the compound is N-cyclopropylmethyl-N-ethyl-2,6-dinitro-p-toluidine.

7. A method according to claim 1 in which the compound is N-cyclopropylmethyl-N-n-propyl-2,6-dinitro-p-toluidine.

8. A method according to claim 1 in which the compound is N,N-bis(cyclopropylmethyl-4-trifluoromethyl-2,6-dinitroaniline.

9. A method according to claim 1 in which the compound is 4-(methylsulfonyl)-2,6-dinitro-N-cyclopropylmethyl-N-ethylaniline.

10. A method according to claim 1 in which the compound is 4-(methylsulfonyl)-2,6-dinitro-N-cyclopropylmethyl-N-n-butylaniline.

11. A method according to claim 1 in which the compound is N-cyclopropyl-N-ethyl-4-trifluoromethyl-2,6-dinitroaniline.

12. A method according to claim 1 in which the compound is N-cyclopropyl-N-cyclopropylmethyl-4-trifluoromethyl-2,6-dinitroaniline.

13. A method according to claim 1 in which the compound is 4-(methylsulfonyl)-2,6-dinitro-N-cyclopropyl-N-ethylaniline.

14. A method according to claim 1 comprising treating soil with said compound prior to the emergence of said undesired vegetation.

15. A method according to claim 1 comprising treating said vegetation after its emergence.

16. A herbicidal composition comprising from about 0.01 wt. percent to about 80 wt. percent of an active ingredient of a compound as defined in claim 1 in admixture with an inert carrier therefor.

17. A composition according to claim 16 in which the carrier is an aromatic petroleum solvent.

18. A composition according to claim 16 in which the compound is N-cyclopropylmethyl-N-n-propyl-4-trifluoromethyl-2,6-dinitroaniline.

References Cited

UNITED STATES PATENTS

| 1,836,295 | 12/1931 | Thiess et al. | 260—577 X |
| 3,111,403 | 11/1963 | Soper | 260—577 X |
| 3,168,442 | 2/1965 | Brunner et al. | 260—577 X |
| 3,257,190 | 6/1966 | Soper | 260—577 X |
| 3,403,180 | 9/1968 | Soper | 71—121 |

FOREIGN PATENTS

| 666,837 | 7/1963 | Canada | 71—121 |

OTHER REFERENCES

Close, Chemical Abstracts, vol. 51, (1957) 10454(b).

JAMES O. THOMAS, Jr., Primary Examiner

U.S. Cl. X.R.

71—88, 94, 95, 98, 105, 118, 121, 76, DIG 1